US009563204B2

(12) United States Patent
Willgert

(10) Patent No.: US 9,563,204 B2
(45) Date of Patent: Feb. 7, 2017

(54) MOWER WITH OBJECT DETECTION SYSTEM

(71) Applicant: Husqvarna AB, Huskvarna (SE)

(72) Inventor: Mikael Willgert, Spånga (SE)

(73) Assignee: HUSQVARNA AB, Huskvarna (SE)

(\*) Notice: Subject to any disclaimer, the term of this patent is extended or adjusted under 35 U.S.C. 154(b) by 16 days.

(21) Appl. No.: 14/420,912

(22) PCT Filed: Aug. 12, 2013

(86) PCT No.: PCT/SE2013/050964
§ 371 (c)(1),
(2) Date: Feb. 11, 2015

(87) PCT Pub. No.: WO2014/027945
PCT Pub. Date: Feb. 20, 2014

(65) Prior Publication Data
US 2015/0220086 A1    Aug. 6, 2015

Related U.S. Application Data

(60) Provisional application No. 61/682,868, filed on Aug. 14, 2012.

(51) Int. Cl.
*G05D 1/02*    (2006.01)
(52) U.S. Cl.
CPC .......... *G05D 1/0214* (2013.01); *G05D 1/0221* (2013.01); *G05D 1/0231* (2013.01); *G05D 1/0238* (2013.01); *G05D 2201/0208* (2013.01)
(58) Field of Classification Search
CPC .. G05D 1/0214; G05D 1/0231; G05D 1/0221; G05D 1/0238; G05D 1/0274; G05D 2201/0208
See application file for complete search history.

(56) References Cited

U.S. PATENT DOCUMENTS

| 5,204,814 A | 4/1993 | Noonan et al. |
| 6,615,108 B1 * | 9/2003 | Peless ............ G05D 1/0265 701/50 |

(Continued)

FOREIGN PATENT DOCUMENTS

| CN | 101091428 A | 12/2007 |
| EP | 1659471 A1 | 5/2006 |

(Continued)

OTHER PUBLICATIONS

International Search Report and Written Opinion of PCT/SE2013/050964 mailed Jan. 31, 2014.

(Continued)

*Primary Examiner* — Dale W Hilgendorf
(74) *Attorney, Agent, or Firm* — Nelson Mullins Riley & Scarborough LLP

(57) ABSTRACT

A method for processing object detection-related information may include receiving information indicative of an encounter between a robotic vehicle and an object responsive to communication received from a sensor of the robotic vehicle while the robotic vehicle transits a parcel, determining a location of the robotic vehicle at a time corresponding to occurrence of the encounter, determining whether the location corresponds to a location associated with a known object associated with the parcel, and classifying the object as an unknown object based on the location not corresponding to the location associated with the known object.

16 Claims, 5 Drawing Sheets

(56) References Cited

U.S. PATENT DOCUMENTS

| | | | |
|---|---|---|---|
| 7,155,309 B2 | 12/2006 | Peless et al. | |
| 7,539,563 B2* | 5/2009 | Yang | G05D 1/0246 701/23 |
| 9,137,943 B2* | 9/2015 | Einecke | A01D 34/008 |
| 2003/0144774 A1 | 7/2003 | Trissel et al. | |
| 2006/0058921 A1* | 3/2006 | Okamoto | G05D 1/0274 701/25 |
| 2009/0149990 A1* | 6/2009 | Myeong | G05D 1/0274 701/26 |
| 2010/0299016 A1* | 11/2010 | Benzler | G05D 1/0246 701/26 |
| 2011/0166705 A1* | 7/2011 | Anderson | A01D 34/008 700/253 |
| 2011/0167574 A1* | 7/2011 | Stout | G05D 1/0274 701/26 |
| 2011/0231016 A1* | 9/2011 | Goulding | G05D 1/0088 700/255 |
| 2012/0029754 A1* | 2/2012 | Thompson | A01D 34/008 701/23 |
| 2012/0101679 A1* | 4/2012 | Anderson | G05D 1/0088 701/23 |
| 2014/0032033 A1* | 1/2014 | Einecke | A01D 34/008 701/24 |

FOREIGN PATENT DOCUMENTS

| | | |
|---|---|---|
| EP | 2169507 A2 | 3/2010 |
| EP | 2229045 B1 | 9/2011 |
| JP | H08256522 A | 10/1996 |
| KR | 101049155 B1 | 7/2011 |
| WO | 2007051972 A1 | 5/2007 |
| WO | 2011062481 A1 | 5/2011 |
| WO | 2011067887 A1 | 6/2011 |
| WO | 2012008084 A1 | 1/2012 |

OTHER PUBLICATIONS

Chapter I of the International Preliminary Report on Patentability of PCT/SE2013/050964 issued on Feb. 17, 2015.

* cited by examiner

MOWER WITH OBJECT DETECTION SYSTEM

TECHNICAL FIELD

Example embodiments generally relate to mowing devices and, more particularly, relate to a mower that is configurable to operate within a predefined area and, within the predefined area, initiate measures to avoid striking objects encountered. Moreover, some embodiments may further be enabled to determine whether an object encountered is a fixed or temporary object.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. More recently, robotic mowers and/or remote controlled mowers have also become options for consumers to consider.

Lawn mowers are typically capable of transiting over even and uneven terrain to execute yard maintenance activities relating to mowing. However, most lawn mowers are repeatedly exposed to the same operating environments over the course of their lifetimes. For example, a lawn mower may operate to cut a single yard over its entire life, or may operate to cut a relatively fixed series of yards or parcels if it is used for commercial purposes. Given that computing devices are becoming more ubiquitous, it is to be expected that they may be employed to assist in operation of lawn mowers. As such, many additional functionalities may be provided or supported by the employment of computing devices on lawn mowers.

BRIEF SUMMARY OF SOME EXAMPLES

Some example embodiments may therefore provide a lawn mowing device having an onboard vehicle positioning module that may be configured to reference a map that is associated with the parcel being currently worked. The map may include defined boundaries for operation of the device and may also define the location of one or more fixed objects located within the boundaries. In some embodiments, the device may further include an object detection module that may be used to detect objects encountered by the device during operation on the parcel. When an object is detected, the object detection module may be configured to determine whether the object is one of the one or more fixed objects. If the object is not one of the one or more fixed objects, the object detection module may inform the operator and/or direct operation of the device to avoid the object. In some embodiments, the object detection module may instruct the device to avoid fixed objects and non-fixed objects by different distances (e.g., keeping a larger distance from unknown objects and allowing a closer approach to known/fixed objects). Furthermore, in some cases, the object detection module may interact with the vehicle positioning module to record the position of the object to enable additional functionality to be performed with respect to the object.

In an example embodiment, a method for processing object detection-related information is provided. The method may include receiving information indicative of an encounter between a robotic vehicle and an object responsive to communication received from a sensor of the robotic vehicle while the robotic vehicle transits a parcel, determining a location of the robotic vehicle at a time corresponding to occurrence of the encounter, determining whether the location corresponds to a location associated with a known object associated with the parcel, and classifying the object as an unknown object based on the location not corresponding to the location associated with the known object.

In another example embodiment, a robotic vehicle is provided. The robotic vehicle may include processing circuitry configured to receive information indicative of an encounter between a robotic vehicle and an object responsive to communication received from a sensor of the robotic vehicle while the robotic vehicle transits a parcel, determine a location of the robotic vehicle at a time corresponding to occurrence of the encounter, determine whether the location corresponds to a location associated with a known object associated with the parcel, and classify the object as an unknown object based on the location not corresponding to the location associated with the known object.

Some example embodiments may improve the ability of operators and/or fleet managers to make lawn mowers operate safely and/or efficiently.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
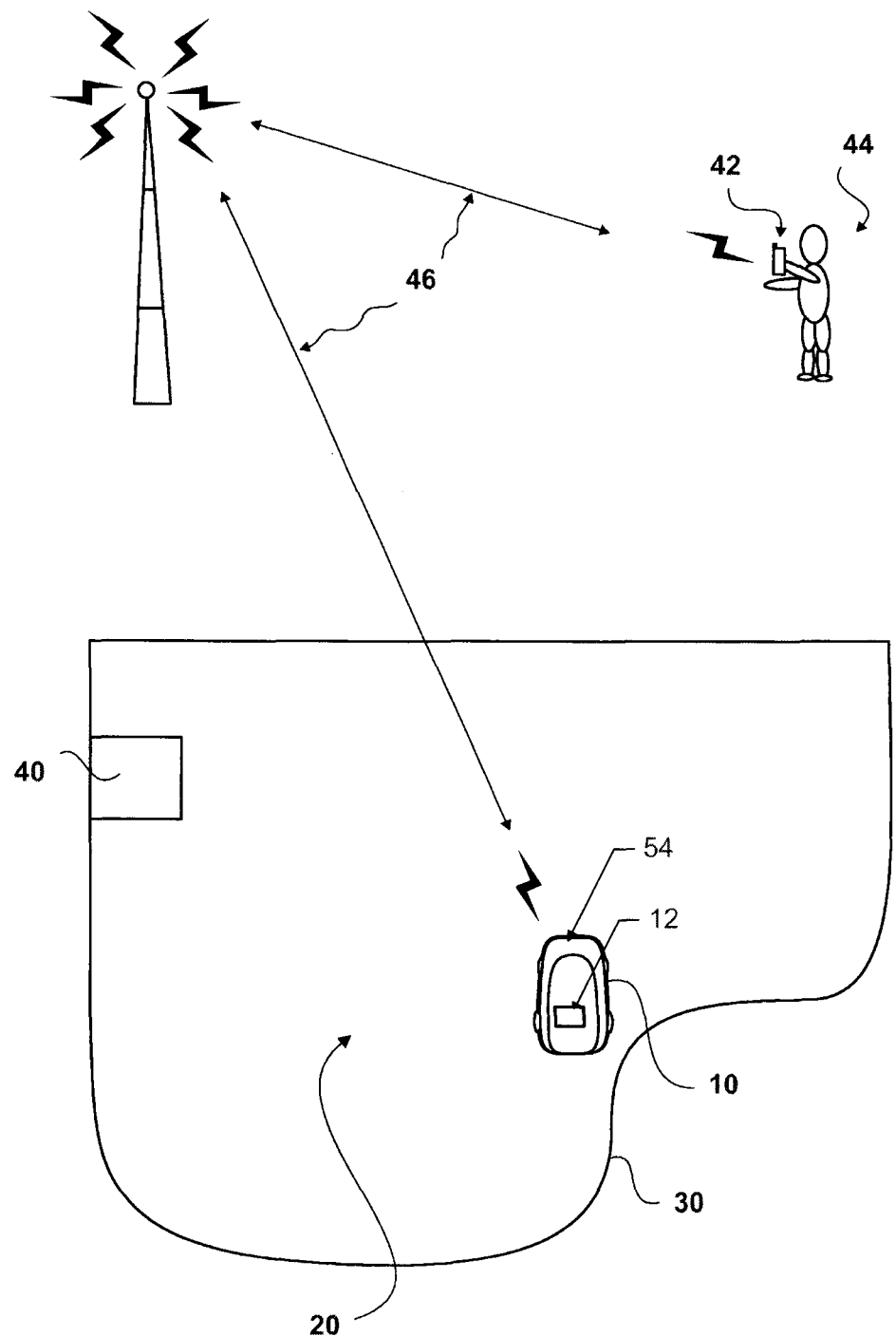
FIG. 1 illustrates an example operating environment for a robotic mower that may employ an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "yard maintenance" is meant to relate to any outdoor grounds improvement or maintenance related activity and need not specifically apply to activities directly tied to grass, turf or sod care. As used herein, operable coupling should be understood to relate to direct or indirect connection that, in either case, enables functional interconnection of components that are operably coupled to each other.

In an example embodiment, a yard maintenance vehicle (e.g., a riding, walk-behind, remote-controlled, or robotic mower) is provided with an onboard positioning module and an object detection module. The positioning module may be configured to enable data related to position and/or orientation information regarding the vehicle to be tracked and/or recorded. The position and/or orientation information may then be stored and/or processed (e.g., by onboard or remote processing and storage equipment) to generate or augment map data associated with a parcel being worked. The map data may include defined boundaries for operation of the vehicle and may also define the location of fixed objects located within the boundaries. The object detection module may be configured to detect objects encountered by the device during operation on within the boundaries. Responsive to detection of an object, the object detection module may be configured to determine whether the object is a fixed objects that is already known. If the object is not a previously known fixed object, the object detection module may inform the operator and/or direct operation of the device to avoid the object. In some embodiments, the object detection module may further interact with the vehicle positioning module to record the position of the object to enable additional functionality to be performed with respect to the object.

Although some embodiments may be employed to provide feedback, warnings, or even implement automatic functionality (e.g., stopping blade rotation and/or stopping drive power application) to a manually operated vehicle responsive to detection of an unknown (or not fixed) object, other embodiments may be employed with respect to a robotic mower or a remotely controlled mower. Since a robotic mower is likely the most complicated embodiment, an example will be described herein in relation to such a mower so that a relatively robust disclosure may be provided. However, it should be appreciated that example embodiments are not limited to application on robotic mowing devices.

FIG. 1 illustrates an example operating environment for a robotic mower 10 that may employ an example embodiment. The robotic mower 10 may operate to cut grass on a parcel 20 (i.e., a land lot), the boundaries of which may be defined using one or more physical boundaries (e.g., a fence, wall, curb and/or the like), a boundary wire 30 or combinations thereof. The boundary wire 30 may emit electrical signals that are detectable by the robotic mower 10 to inform the robotic mower 10 when a boundary of the parcel 20 has been reached. The robotic mower 10 may be controlled, at least in part, via control circuitry 12 located onboard. The control circuitry 12 may include, among other things, a positioning module and an object detection module, which will be described in greater detail below. Accordingly, the robotic mower 10 may utilize the control circuitry to define map data indicative of the parcel 20 in terms of defining the boundaries of the parcel and/or the location of fixed objects thereon.

In an example embodiment, the robotic mower 10 may be battery powered via one or more rechargeable batteries. Accordingly, the robotic mower 10 may be configured to return to a charge station 40 that may be located at some position on the parcel 20 in order to recharge the batteries. The batteries may power a drive system and a blade control system of the robotic mower 10. However, the control circuitry 12 of the robotic mower 10 may selectively control the application of power or other control signals to the drive system and/or the blade control system to direct the operation of the drive system and/or blade control system. Accordingly, movement of the robotic mower 10 over the parcel 20 may be controlled by the control circuitry in a manner that enables the robotic mower 10 to systematically traverse the parcel while operating a cutting blade to cut the grass on the parcel 20.

In some embodiments, the control circuitry 12 may be configured to communicate wirelessly with an electronic device 42 (e.g., a computer, mobile telephone, PDA, smart phone, and/or the like) of a remote operator 44 via a wireless communication network 46. However, the wireless network 46 and other remote devices may not be employed in some embodiments. The wireless network 46 may be a data network, such as a local area network (LAN), a metropolitan area network (MAN), a wide area network (WAN) (e.g., the Internet), and/or the like, which may couple the robotic mower 10 to devices such as processing elements (e.g., personal computers, server computers or the like) or databases. Communication between the wireless network 46 and the devices or databases (e.g., servers, electronic device 42, control circuitry 12) may be accomplished by either wireline or wireless communication mechanisms and corresponding protocols.

Figure 2B:
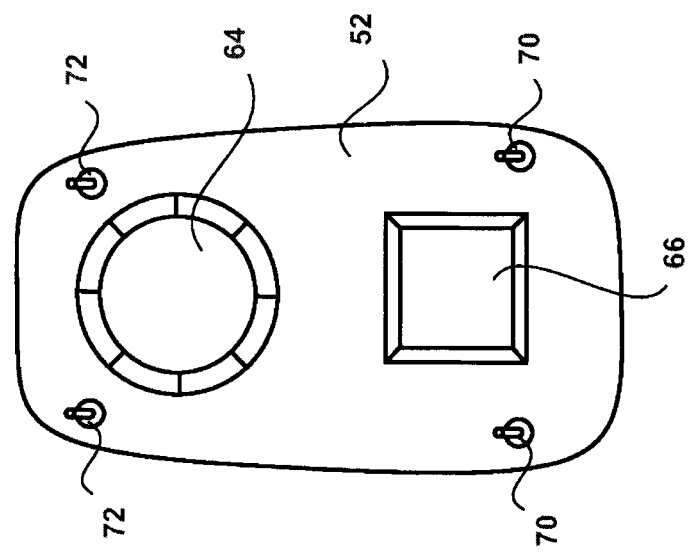
FIG. 2B illustrates a schematic view of an inner housing and various other components of the robotic mower according to an example embodiment.
Figure 2A:
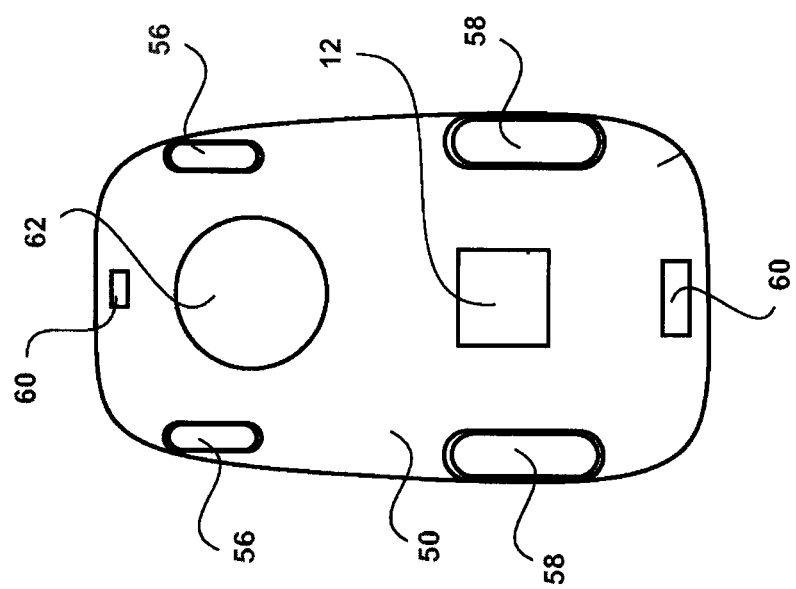
FIG. 2A illustrates a schematic view of a base plate and various components of the robotic mower according to an example embodiment.

FIG. 2, which includes FIGS. 2A and 2B, illustrates some of the parts that may be employed in connection with an example of the robotic mower 10. However, it should be appreciated that example embodiments may be employed on numerous other vehicles that may employ different designs. FIG. 2A illustrates a schematic view of a base plate and various components of the robotic mower according to an example embodiment and FIG. 2B illustrates a schematic view of an inner housing and various other components of the robotic mower according to an example embodiment.

Referring to FIGS. 1 and 2, the robotic mower 10 may include a base plate 50, an inner housing 52 and an outer housing 54. The inner housing 52 may be configured to be arranged on top of the base plate 50 and the outer housing 54 may be configured to be arranged on top of the inner housing 52. The base plate 50 may form a support structure from which one or more front wheels 56 and one or more rear wheels 58 may be supported. In some embodiments, the one or more rear wheels 58 may be relatively large as compared to the one or more front wheels 56. Moreover, the one or more rear wheels 58 may be configured to operate either in a forward or backward direction, but may otherwise not be steerable. However, the one or more front wheels 56 may be steerable responsive to control by the control circuitry 12. Alternatively, the front wheels 56 may be swivel wheels capable of following any direction as required by the control of the rear wheels 58.

In an example embodiment, the base plate 50 may further include one or more sensors 60 that may be used to detect the boundary wire 30 and/or objects that may form part of the boundary of the parcel. The sensors 60 may also detect objects that may be encountered during operation of the robotic mower 10 within the boundaries of the parcel 20. These objects may be fixed or temporary (e.g., movable) objects. In some cases, the sensors 60 may include a front sensor and a rear sensor. However, it should be appreciated that any number of sensors may be employed and they may be disposed at any desirable location on the robotic mower 10. The sensors 60 may include sensors related to positional determination (e.g., a GPS receiver, an accelerometer, a camera, a radar transmitter/detector, an ultrasonic sensor, a laser scanner and/or the like). Thus, for example, positional determinations may be made using GPS, inertial navigation, optical flow, radio navigation, visual location (e.g., VSLAM) and/or other positioning techniques or combinations thereof. Accordingly, the sensors 60 may be used, at least in part, for determining the location of the robotic mower 10 relative to boundaries or other points of interest (e.g., a starting point or other key features) of the parcel 20, or determining a position history or track of the robotic mower 10 over time.

The base plate 50 may further support a cutting motor 62 configured to drive a cutting blade or other cutters of the robotic mower 10. In some embodiments, the outer housing 54 and the inner housing 52 may be plastic, light metal, or other similarly lightweight components. The inner housing 52 may include a cover 64 for the cutting motor 62. In some embodiments, a user interface (e.g., display 66) may be provided on the inner housing 52. The user interface may be employed to interface with the control circuitry 12 for controlling operations of the robotic mower 10.

In some embodiments, the sensors 60 may include sensors specifically provided for detecting objects (other than the boundary wire 30 or objects forming boundaries of the parcel 20) and/or sensors for detecting lifting (or tipping beyond a threshold amount) of the robotic mower 10. Alternatively, separate sensors (e.g., collision sensors 70 and lifting sensors 72) may be provided for each function, and those sensors may be capable of communicating with the control circuitry 12 in addition to the sensors 60.

Figure 3:
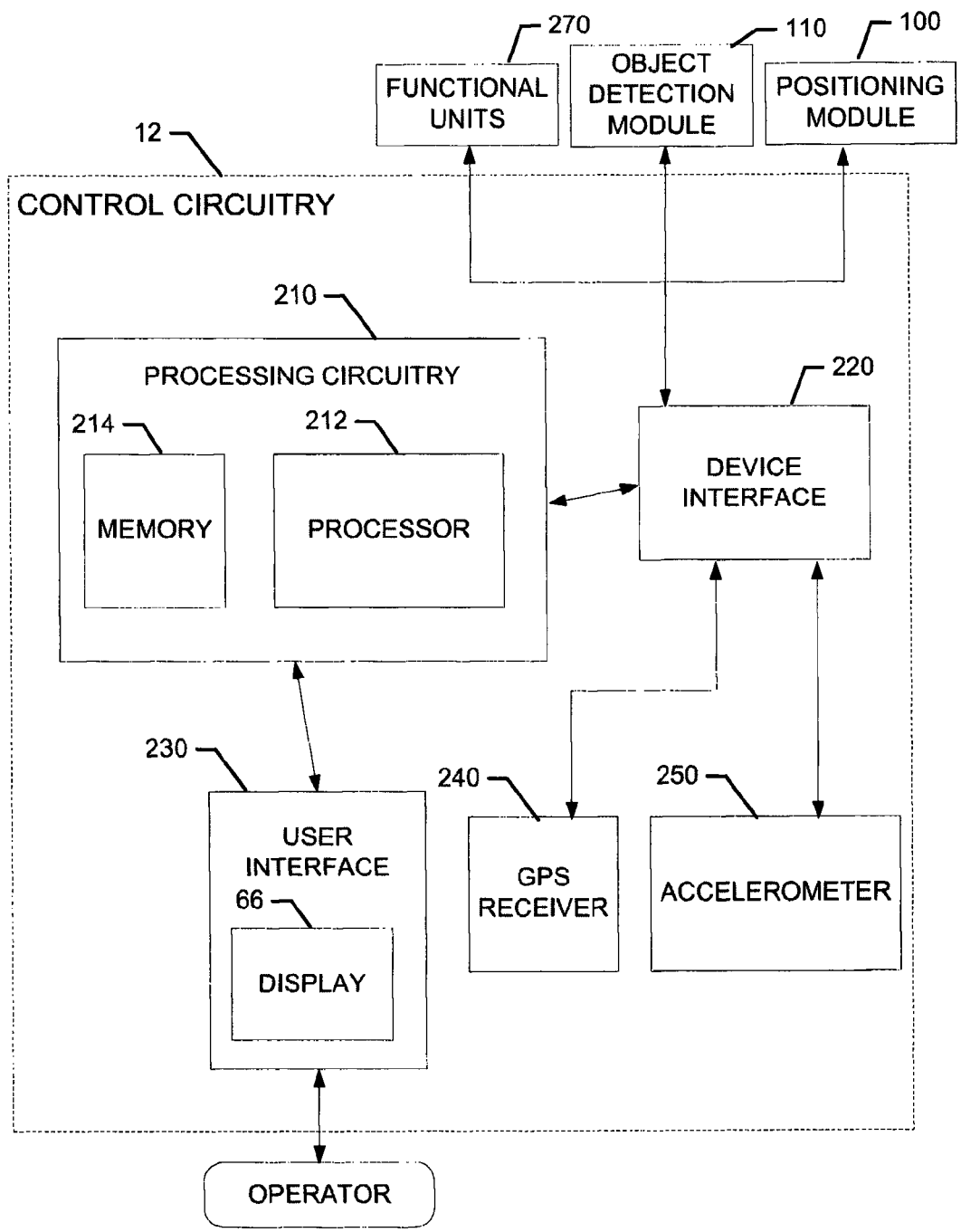
FIG. 3 illustrates a block diagram of various components of processing circuitry of the robotic mower to illustrate some of the components that enable the functional performance of the robotic mower and to facilitate description of an example embodiment.

FIG. 3 illustrates a block diagram of various components of the control circuitry 12 to illustrate some of the components that enable the functional performance of the robotic mower 10 and to facilitate description of an example embodiment. In some example embodiments, the control circuitry 12 may include or otherwise be in communication with positioning module 100 and an object detection module 110 disposed at the robotic mower 10. As such, for example, the functions attributable to the positioning module 100 and/or the object detection module 110 may be carried out by the control circuitry 12.

The control circuitry 12 may include processing circuitry 210 that may be configured to perform data processing, control function execution and/or other processing and management services according to an example embodiment of the present invention. In some embodiments, the processing circuitry 210 may be embodied as a chip or chip set. In other words, the processing circuitry 210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 210 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 210 may include one or more instances of a processor 212 and memory 214 that may be in communication with or otherwise control a device interface 220 and, in some cases, a user interface 230 (e.g., display 66). As such, the processing circuitry 210 may be embodied as a circuit chip (e.g., an integrated circuit chip) configured (e.g., with hardware, software or a combination of hardware and software) to perform operations described herein. However, in some embodiments, the processing circuitry 210 may be embodied as a portion of an on-board computer. In some embodiments, the processing circuitry 210 may communicate with electronic components and/or sensors (e.g., sensors 60, collision sensors 70 and/or lifting sensors 72) of the robotic mower 10 via a single data bus. As such, the data bus may connect to a plurality or all of the switching components and/or other electrically controlled components of the robotic mower 10.

The user interface 230 (if implemented) may be in communication with the processing circuitry 210 to receive an indication of a user input at the user interface 230 and/or to provide an audible, visual, mechanical or other output to the user. As such, the user interface 230 may include, for example, a display (e.g., display 66), one or more buttons or keys (e.g., function buttons), and/or other input/output mechanisms (e.g., microphone, speakers, cursor, joystick, lights and/or the like).

The device interface 220 may include one or more interface mechanisms for enabling communication with other devices (e.g., sensors of a sensor network including sensors 60, collision sensors 70 and/or lifting sensors 72 and/or other accessories or functional units 270 such as motors, servos, switches or other operational control devices for automatic responses). In some cases, the device interface 220 may be any means such as a device or circuitry embodied in either hardware, or a combination of hardware and software that is configured to receive and/or transmit data from/to sensors in communication with the processing circuitry 210. In some example embodiments, the device interface 220 may provide interfaces for communication of components internal to the positioning module 100 and/or the object detection module 110 (as shown in the example of FIG. 3). However, in other embodiments, components of the sensor network (e.g., including GPS receiver 240 and/or accelerometer 250) may be external to the positioning module 100 and the object detection module 110, and the device interface 220 may still provide interface capabilities for interaction with such components. Automatic responses such as operational control functions that implement automatic actions to be taken responsive to detection of certain stimuli may also be provided via the device interface 220. For example, shutdown of the cutting motor 62 (e.g., responsive to tipping or lifting of the robotic mower 10), stopping movement or changing direction of the robotic mower 10 (e.g., responsive to encountering an object or boundary) may be initiated under control of the processing circuitry 210 via interfaces provided by the device interface 220. Additionally or alternatively, interactions implemented via the provision of control signals to the functional units 270 may be initiated via the device interface 220.

In embodiments employing a sensor network, the sensor network may include one or more sensors (e.g., sensors 60 and/or collision sensors 70 and lifting sensors 72) disposed at any of various locations on the robotic mower 10 to monitor various parameters. For example, one or more sensors may determine vehicle speed/direction, vehicle location, object presence, vehicle orientation and/or the like. Sensors may also be used to determine motor run time, machine work time, and other operational parameters. In some embodiments, positioning and/or orientation sensors (e.g., global positioning system (GPS) receiver 240 and/or accelerometer 250) may be included to monitor, display and/or record data regarding vehicle position and/or orientation. In this regard, for example, the GPS receiver 240 may be configured to generate map data corresponding to latitude, longitude, speed, elevation, time, data and/or the like of the riding yard maintenance vehicle 10, and communicate such data to the processing circuitry 210. Meanwhile, for example, the accelerometer 250 may be configured to generate data corresponding to horizontal, vertical, and rotational accelerations of the riding yard maintenance vehicle 10, and communicate such data to the processing circuitry 210. As such, information such as pitch angle, roll angle and yaw angle may be determinable using one or more sensors of the sensor network. Data from the sensors (including the data from the GPS receiver 240, the accelerometer 250 and/or other sensors) may be fed to the processing circuitry 210 for storage, display, or for use in connection with applications that may be executed by processing circuitry 210.

The positioning module 100 may be configured to utilize one or more sensors (e.g., sensors 60, which may include GPS receiver 240 and/or accelerometer 250) to determine a location of the robotic mower 10. The robotic mower 100 (or more specifically, the control circuitry 12) may use the location information to determine a mower track and provide full coverage of the parcel 20 to ensure the entire parcel is mowed. The positioning module 100 may therefore be configured to determine a location of the robotic mower 10 relative to map data descriptive of the parcel 20.

The object detection module 110 may employ one or more sensors (e.g., sensors 60 and/or collision sensors 70) to determine when an object is detected. When an object is detected, the processing circuitry 210 may be informed so that the location of the robotic mower 10 at the time of detection of the detected object may be noted. Thus, when an indication is received from the object detection module 110 to inform the processing circuitry 210 that the detected object has been encountered, the processing circuitry 210 may access position information from the positioning module 100 to associate the detected object with the corresponding location.

The processor 212 may be embodied in a number of different ways. For example, the processor 212 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform the operations described herein.

In an example embodiment, the processor 212 (or the processing circuitry 210) may be embodied as, include or otherwise control the positioning module 100 and the object detection module 110. As such, in some embodiments, the processor 212 (or the processing circuitry 210) may be said to cause each of the operations described in connection with the positioning module 100 and the object detection module 110 by directing the positioning module 100 and the object detection module 110, respectively, to undertake the corresponding functionalities responsive to execution of instructions or algorithms configuring the processor 212 (or processing circuitry 210) accordingly. As an example, the positioning module 100 may be configured to record position and/or orientation information of the robotic mower 10 and the object detection module 110 may be configured to record or otherwise identify interactions with objects as described herein. The processing circuitry 210 may then, in some cases, process the information from one or both of the positioning module 100 and the object detection module 110 to avoid objects, generate alerts, warnings, position histories, map data identifying known and/or unknown object locations, and/or the like.

In an exemplary embodiment, the memory 214 may include one or more non-transitory memory devices such as, for example, volatile and/or non-volatile memory that may be either fixed or removable. The memory 214 may be configured to store information, data, applications, instructions or the like for enabling the positioning module 100 and/or the object detection module 110 to carry out various functions in accordance with exemplary embodiments of the present invention. For example, the memory 214 could be configured to buffer input data for processing by the processor 212. Additionally or alternatively, the memory 214 could be configured to store instructions for execution by the processor 212. As yet another alternative, the memory 214 may include one or more databases that may store a variety of data sets responsive to input from the sensor network. Among the contents of the memory 214, applications may be stored for execution by the processor 212 in order to carry out the functionality associated with each respective application. In some cases, the applications may include a comparison of information indicative of a detected object to stored information about the parcel 20 currently being worked in order to determine whether the detected object is a known object. A safety distance may then be maintained between the robotic mower 10 and a detected object. Moreover, in some cases, the safety distance may be different for known and unknown objects (e.g., a larger safety distance may be provided for unknown objects).

Thus, for example, the memory 214 may store a parcel descriptor file including map data defining boundaries of the parcel 20 and location information identifying any known (e.g., fixed) objects on the parcel 20 along with their respective locations (e.g., GPS coordinates or distance/direction from another known location or position). When the detected object is encountered, the map data of the parcel descriptor file may be accessed (via the processing circuitry 210) to determine whether the detected object correlates to one of the known objects on the parcel 20 via a comparison of the location of the detected object to the corresponding locations of known objects on the parcel 20. If no known object on the parcel 20 is found to match the location of the detected object, the detected object may be determined (via the processing circuitry 210) to be a living or otherwise movable/temporary object. Generically, such an object may be referred to as an unknown object. A location of the unknown object may then be recorded in an operational file that is associated with the parcel descriptor file. The operational file may include data for the last run over the parcel 20, a predetermined number of prior runs over the parcel 20, or all runs over the parcel 20 by the robotic mower 10 and may be an update to the parcel descriptor file or a separate file associated therewith.

In some embodiments, when an unknown object is detected, the robotic mower 10 may simply avoid the unknown object. However, in other embodiments, the location of the unknown object may be recorded as described above. Additionally or alternatively, an operator may be informed of the existence of the unknown object. For example, an alarm may sound, a message may be provided on the display 66, or a message may be transmitted to a remote operator. In embodiments where the processing circuitry 210 is employed on a ride-on vehicle or a walk behind vehicle, the operator may be informed immediately so that the operator can take action (e.g., move the object, avoid the object, etc.). In some cases, the operator may be enabled to utilize the user interface 230 to clear a warning or to confirm an identity of an unknown object. For example, the operator may have placed a new permanent structure on the parcel 20. Thus, responsive to receiving a report (on the display 66 or remotely either in real time or via a report of prior activity) that the robotic mower 10 encountered the unknown object, the operator may instruct the processing circuitry 210 to store the location of the unknown object as a known object. Although not required, an identity of the object may also be stored in some cases. Alternatively, the operator may cancel storage of an unknown object location (e.g., if the operator moves the unknown object).

In an example embodiment, the processing circuitry 210 may be configured to record the locations of any and all unknown objects and confirm the existence of known objects during operation on the parcel 20 and record the information in the operational file. The operational file may then be referenced in future runs over the parcel 20 to determine whether a particular one of the unknown objects is encountered again in subsequent runs. In some embodiments, the processing circuitry 210 may be configured to convert the classification of an object that is encountered in the same location over a predetermined number of runs of the parcel 20 from an unknown object to a known object. Thus, even without operator input, objects may have their classification updated in response to repeated interaction with an object over a period of time.

Accordingly, example embodiments may avoid contact with objects that may be living objects or temporary objects (i.e., unknown objects) by determining that the objects are not objects that are known to be fixed in their location on the parcel 20. However, some embodiments may further enable the location of unknown objects encountered to be stored and/or reported to the operator so that the operator can move the object or confirm that it is a permanent object, or so that the robotic mower 10 (e.g., via the processing circuitry 210) may determine that the object is a permanent object responsive to repeated encounters with the object in the same location over a plurality of runs over the parcel 20.

In an example embodiment, the processing circuitry 210 may be configured to generate display views and/or screen emulations to display data gathered by the sensor network and/or to display information generated based on the data gathered by the sensor network either locally or remotely (responsive to communication of the information via a wireless network or via communication established at the charge station 40. Alternatively or additionally, the processing circuitry 210 may be configured to generate reports or displays to illustrate information determinable based on the data. In some embodiments, the processing circuitry 210 may process, direct display of and/or store GPS position data (e.g., as a position history), speed information, information regarding object detection, map views, and/or the like. Thus, for example, the processing circuitry 210 may direct storage of the data or other information generated based on the data in the memory 214. As such, the processing circuitry 210 may organize the data or information for reporting or for use in other applications that may be locally or remotely executed. For example, the processing circuitry 210 may store data for reporting to a computer executing fleet management software to manage a fleet of lawn mowers for implementation of efficient service, maintenance and operation management.

In some cases, information associated with the positioning module 100 and/or the object detection module 110 itself may be extracted from the robotic mower 10 and mated with a remote network terminal or computer. The information stored on the memory 214 may then be extracted and thereby reported for fleet management or other applications. In other cases, the device interface 220 may be configured to wirelessly transmit information associated with the positioning module 100 and/or the object detection module 110 to a remote computer to enable data processing to be accomplished on the remote computer. For example, in some cases, BLUETOOTH (e.g., in accordance with the standard IEEE 802.15.1), WIFI (e.g., in accordance with the standard IEEE 802.11) or other wireless communication modules may be provided by the device interface 220 in order to allow wireless downloading of software, support information or other data, or allow wireless uploading of data to network devices for support, management or other purposes. In some embodiments, BLUETOOTH, WIFI or other short range wireless communication modules may be used to communicate data to an intermediate device (e.g., a cell phone), which may then communicate the data to a computer or other device at which certain analysis and/or display may be performed. In still other cases, a removable memory device may be used to transfer information from the memory 214 to the removable memory device and thereafter to the remote computer.

In some cases, information may also be uploaded from the remote network terminal or computer to the positioning module 100 and/or the object detection module 110. For example, upgrading software to improve the functionality of the positioning module 100 and/or the object detection module 110 may be uploaded. In some embodiments, software upgrading user interface capabilities, adding new sensor interface capability, and/or adding other improved functionality may be added via upload in order to upgrade the positioning module 100 and/or the object detection module 110.

Figure 4:
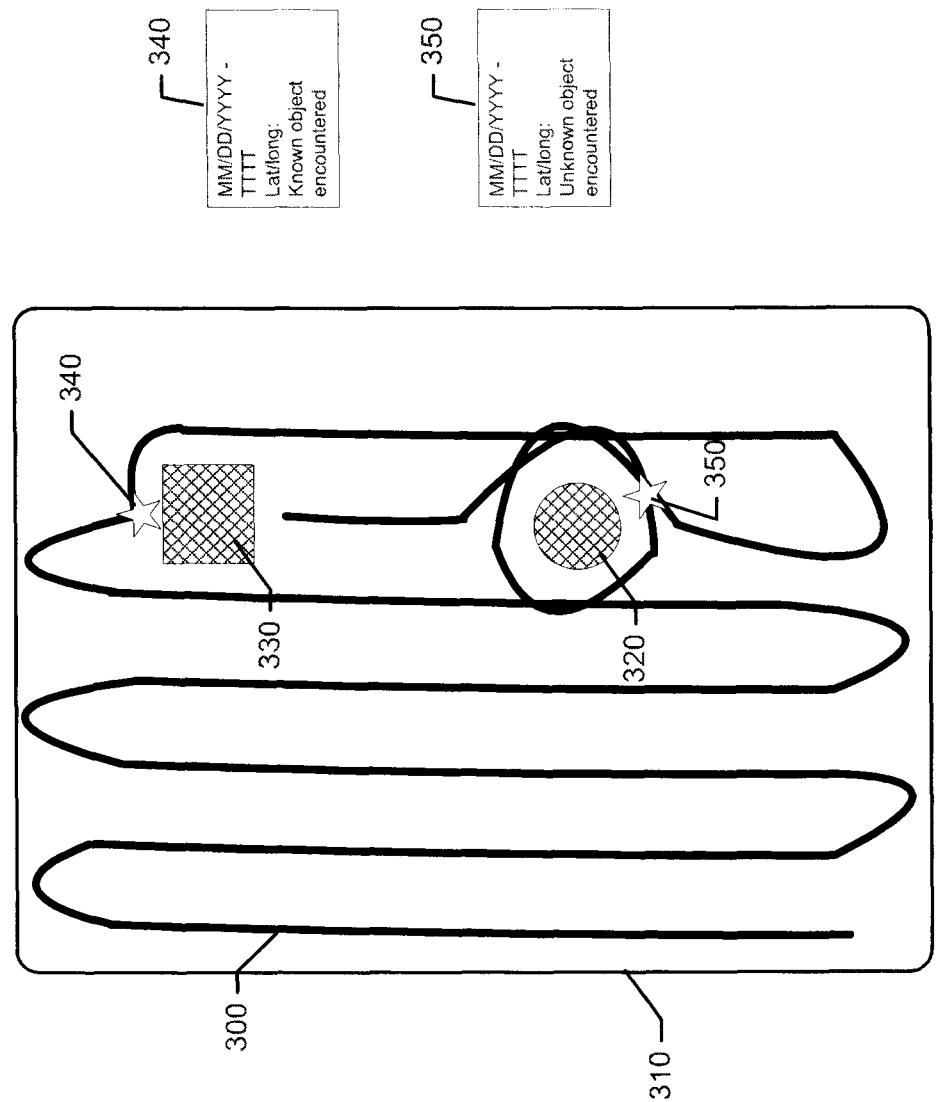
FIG. 4 illustrates an example of a route traced by a mower over a particular semi-rectangular parcel that is bounded by a boundary wire according to an example embodiment.

FIG. 4 illustrates an example of a route 300 traced by a mower (e.g., the robotic mower 10) over a particular semi-rectangular parcel that is bounded by a boundary wire 310. The route 300 may represent a recorded position history defining route data for a particular run of the mower over the parcel. As such, the route 300 may be representative of map data that may be stored in connection with an example embodiment. However, in some embodiments, the map data may alternatively or additionally include data defining the boundaries of the parcel and any objects disposed thereon (e.g., unknown object 320 and known object 330).

As shown in FIG. 4, the mower may transit the route 300 and encounter an object at event 340. The encounter may be recorded to define a time of the event, a location and perhaps also a classification of the event. In some embodiments, the classification may be made via operation of the processing circuitry 210 as described above. In other words, the processing circuitry 210 may compare the location of the event 340 with known object locations. If no known object location is found, the event 340 may be classified as an encounter with an unknown object. However, in this example, since the location of the event 340 correlates to a known object location, then the event 340 may be classified as an encounter with a known object (e.g., known object 330).

The mower may continue to transit the route 300 after turning away from the known object 330 at event 340. At event 350, the mower may encounter another object. The encounter may be recorded as described above. In this case, however, since no known object location is found to match the location of the event 350, the event 350 may be classified as an encounter with an unknown object (e.g., unknown object 320). One or more of the responses described above may thereafter further be initiated (e.g., issuing a warning, shutting off the cutting motor, providing a notification to the operator, storing the location for comparison to future encounters, confirmation of a previously unknown object as a known or fixed object, steering away from the object, avoiding the object by a predetermined safety distance, etc.). In some embodiments, the processing circuitry 210 may be further configured to define one safely distance for known objects and a different (e.g., larger) safety distance for an unknown object. Accordingly, for example, a closer approach may be provided to cut around known objects, but a wider space may be maintained between the robotic mower 10 and any potential living objects (e.g., unknown objects).

In some embodiments, detection of an object may involve the recording of a position of the robotic mower 10 at a point at which a detection event is experienced. However, in other embodiments, the location of the object itself may be recorded and/or determined responsive to an incorporation of such information as distance and direction to the object, if such information is determinable using the sensors of the robotic mower 10. Thus, positioning information regarding object location may employ only robotic mower location information or may employ a combination of robotic mower location and distance/angle information to the object.

Visual triangulation or other detection techniques employing visual sensors, ultrasonic sensors and/or the like to obtain distance, direction or other position related information may be employed to determine object location relative to the robotic mower 10. Moreover, in some cases, responsive to a plurality of approaches to an object at different angles, information regarding object location may be updated to improve accuracy with each subsequent pass. In systematic, route based mowing, the object may be approached from a limited number of angles (or only a single angle). However, with random mowing patterns, many different angles and/or detection distances could apply. Thus, in some cases, when an object is discovered via one angle of approach, some embodiments may cause the robotic mower 10 to be steered such that the object can be approached from other angles to facilitate the acquisition more accurate positioning data. Additionally or alternatively, the detection of an object using one sensor may lead to the employment of other available sensors in an effort to provide additional data for more accurate positioning.

Embodiments of the present invention may therefore be practiced using an apparatus such as the one depicted in FIG. 3. However, other embodiments may be practiced in connection with a computer program product for performing embodiments of the present invention. As such, for example, each block or step of the flowcharts of FIG. 5, and combinations of blocks in the flowchart, may be implemented by various means, such as hardware, firmware, processor, circuitry and/or another device associated with execution of software including one or more computer program instructions. Thus, for example, one or more of the procedures described above may be embodied by computer program instructions, which may embody the procedures described above and may be stored by a storage device (e.g., memory 214) and executed by processing circuitry (e.g., processor 212).

As will be appreciated, any such stored computer program instructions may be loaded onto a computer or other programmable apparatus (i.e., hardware) to produce a machine, such that the instructions which execute on the computer or other programmable apparatus implement the functions specified in the flowchart block(s) or step(s). These computer program instructions may also be stored in a computer-readable medium comprising memory that may direct a computer or other programmable apparatus to function in a particular manner, such that the instructions stored in the computer-readable memory produce an article of manufacture including instructions to implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s). In this regard, a method according to example embodiments of the invention may include any or all of the operations shown in FIG. 5. Moreover, other methods derived from the descriptions provided herein may also be performed responsive to execution of steps associated with such methods by a computer programmed to be transformed into a machine specifically configured to perform such methods.

Figure 5:
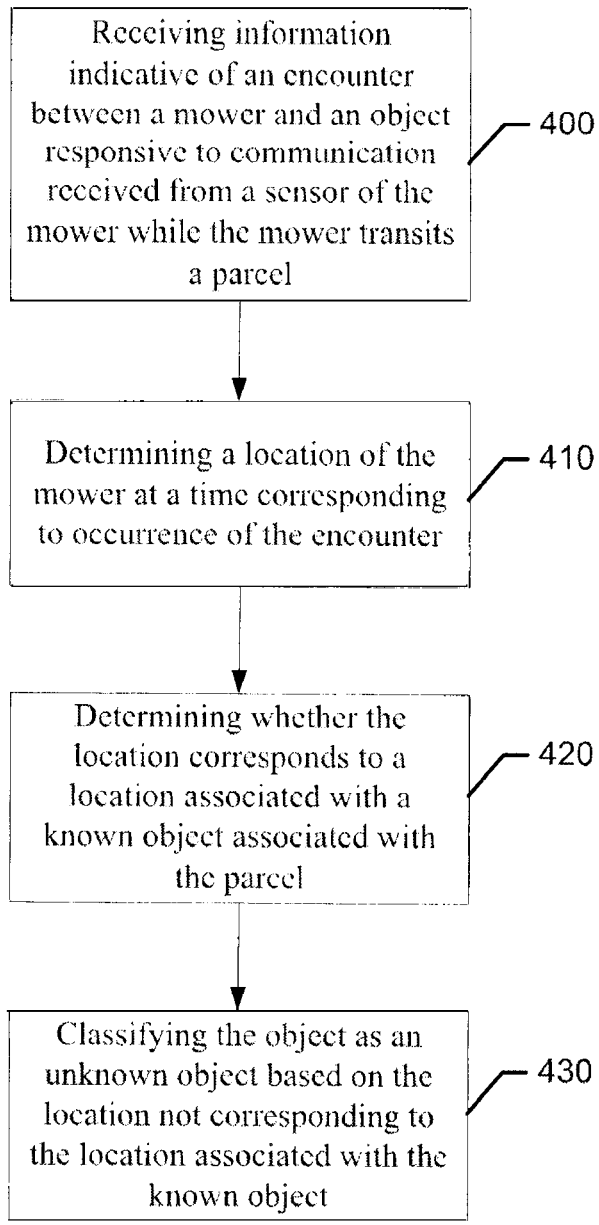
FIG. 5 illustrates a block diagram of a method according to an example embodiment.

In an example embodiment, a method for processing object detection-related information, as shown in FIG. 5, may include receiving information indicative of an encounter between a mower and an object responsive to communication received from a sensor of the mower while the mower transits a parcel at operation 400. The method may further include determining a location of the mower at a time corresponding to occurrence of the encounter at operation 410 and determining whether the location corresponds to a location associated with a known object associated with the parcel at operation 420. The method may further include classifying the object as an unknown object based on the location not corresponding to the location associated with the known object at operation 430. When an unknown object is detected, the mower may take further action such as avoiding contact with the object, stopping cutting activity, reporting the presence of the object to an operator, reclassifying the object, sounding a warning, combinations thereof, and/or the like. As indicated above, the avoidance of the object may be accomplished by providing a larger safety buffer between the mower and the object when the object is an unknown object.

In an example embodiment, an apparatus for performing the method of FIG. 5 above may comprise a processor (e.g., the processor 212) configured to perform some or each of the operations (400-430) described above. The processor 212 may, for example, be configured to perform the operations (400-430) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 400-430 may comprise, for example, the control circuitry 12. Additionally or alternatively, at least by virtue of the fact that the processor 212 may be configured to control or even be embodied as the control circuitry 12, the processor 212 and/or a device or circuitry for executing instructions or executing an algorithm for processing information as described above may also form example means for performing operations 400-430.

In some embodiments, additional optional operations may be included or the operations described above may be modified or augmented. Each of the additional operations, modification or augmentations may be practiced in combination with the operations above and/or in combination with each other. Thus, some, all or none of the additional operations, modification or augmentations described herein may be utilized in some embodiments. In this regard, in some cases, the method may further include defining a safety distance for avoidance of the object based on a classification of the object. In this regard, defining the safety distance may include defining a first safety distance for the object if the object is classified as the known object and defining a larger second safety distance for the object if the object is classified as the unknown object. In an example embodiment, the method may further include storing the location in association with the encounter in response to the object being classified as the unknown object. In some cases, the method may further include, in response to a plurality of encounters at a same location, classifying a previously unknown object as a fixed object. Alternatively or additionally, the method may further include, in response to more than one encounter at a same location within a given period of time, classifying a previously unknown object as a fixed object. Alternatively or additionally, the method may further include, in response to operator input, classifying a previously unknown object as a fixed object. In some cases, storing the location may include storing the location locally at the robotic vehicle or remotely. In such an example, the method may further include enabling an operator to delete the stored location. In some embodiments, any or all of the above modifications may be included and determining the location may include determining the location using one or more of global positioning system, inertial navigation, optical flow, radio navigation, and visual location techniques. In some examples, any or all of the above modifications may be included and the sensor may be a camera, a radar device, a laser scanner, or an ultrasonic sensor. In some embodiments, any or all of the above modifications may be included and determining the location may include determining the location relative to a map stored at the robotic vehicle.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed is:

1. A method comprising:
   receiving information indicative of an encounter between a robotic vehicle and an object responsive to communication received from a sensor of the robotic vehicle while the robotic vehicle transits a parcel;
   determining a location of the robotic vehicle at a time corresponding to occurrence of the encounter;
   determining whether the location corresponds to a location associated with a known object associated with the parcel;
   classifying the object as an unknown object based on the location not corresponding to the location associated with the known object, and
   defining a safety distance for the object based on a classification of the object,
   wherein defining the safety distance comprises defining a first safety distance for the object if the object is classified as the known object and defining a larger second safety distance for the object if the object is classified as the unknown object.

2. The method of claim 1, further comprising storing the location in association with the encounter in response to the object being classified as the unknown object.

3. The method of claim 2, further comprising, in response to a plurality of encounters at a same location, classifying a previously unknown object as a fixed object.

4. The method of claim 2, further comprising, in response to more than one encounter at a same location within a given period of time, classifying a previously unknown object as a fixed object.

5. The method of claim 2, further comprising, in response to operator input, classifying a previously unknown object as a fixed object.

6. The method of claim 2, wherein storing the location comprises storing the location locally at the robotic vehicle or remotely.

7. The method of claim 6, further comprising enabling an operator to delete the stored location.

8. The method of claim 1, wherein determining the location comprises determining the location using one or more of global positioning system, inertial navigation, optical flow, radio navigation, and visual location techniques.

9. The method of claim 1, wherein the sensor comprises a camera, a radar device, a laser scanner, or an ultrasonic sensor.

10. The method of claim 1, wherein determining the location comprises determining the location relative to a map stored at the robotic vehicle.

11. A robotic vehicle comprising processing circuitry configured to:
    receive information indicative of an encounter between a robotic vehicle and an object responsive to communication received from a sensor of the robotic vehicle while the robotic vehicle transits a parcel;

determine a location of the robotic vehicle at a time corresponding to occurrence of the encounter;

determine whether the location corresponds to a location associated with a known object associated with the parcel;

classify the object as an unknown object based on the location not corresponding to the location associated with the known object, and define a safety distance for the object based on a classification of the object, wherein defining the safety distance comprises defining a first safety distance for the object if the object is classified as the known object and defining a larger second safety distance for the object if the object is classified as the unknown object.

12. The robotic vehicle of claim 11, further comprising storing the location in association with the encounter in response to the object being classified as the unknown object.

13. The robotic vehicle of claim 12, further comprising, in response to a plurality of encounters at a same location, classifying a previously unknown object as a fixed object.

14. The robotic vehicle of claim 12, further comprising, in response to more than one encounter at a same location within a given period of time, classifying a previously unknown object as a fixed object.

15. The robotic vehicle of claim 12, further comprising, in response to operator input, classifying a previously unknown object as a fixed object.

16. The robotic vehicle of claim 12, wherein storing the location comprises storing the location locally at the robotic vehicle or remotely.

* * * * *